(12) United States Patent
Toyota

(10) Patent No.: US 9,399,381 B2
(45) Date of Patent: Jul. 26, 2016

(54) VEHICLE SUSPENSION DEVICE

(71) Applicant: Satoru Toyota, Nagoya (JP)

(72) Inventor: Satoru Toyota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/404,871

(22) PCT Filed: Feb. 14, 2013

(86) PCT No.: PCT/JP2013/053471
§ 371 (c)(1),
(2) Date: Dec. 1, 2014

(87) PCT Pub. No.: WO2013/179692
PCT Pub. Date: Dec. 5, 2013

(65) Prior Publication Data
US 2015/0123329 A1    May 7, 2015

(30) Foreign Application Priority Data
Jun. 1, 2012  (JP) .................. 2012-125771

(51) Int. Cl.
*B60G 13/00* (2006.01)
*B60G 15/06* (2006.01)
*F16F 1/12* (2006.01)
*F16F 9/32* (2006.01)

(52) U.S. Cl.
CPC .............. *B60G 15/06* (2013.01); *B60G 15/063* (2013.01); *F16F 1/126* (2013.01); *F16F 9/32* (2013.01); *B60G 2202/32* (2013.01); *B60G 2204/10* (2013.01); *B60G 2204/1242* (2013.01)

(58) Field of Classification Search
CPC .............. B60G 15/063; B60G 17/021; B60G 2204/12422; B60G 11/16; B60G 17/00
USPC .................. 267/221, 34, 286; 188/321.11; 280/6.157, 124.147, 124.162
See application file for complete search history.

(56) References Cited

U.S. PATENT DOCUMENTS

| 3,069,149 A | * | 12/1962 | Neff ................. B60G 7/04 267/33 |
| 3,954,255 A | * | 5/1976 | Keijzer ............. B60G 15/063 267/218 |
| 2003/0111782 A1 | | 6/2003 | Miyagawa et al. |

(Continued)

FOREIGN PATENT DOCUMENTS

| DE | 3730177 A1 | * | 3/1989 | ........... B60G 15/063 |
| DE | 102005050023 A1 | * | 5/2007 | ............. B60G 11/16 |

(Continued)

OTHER PUBLICATIONS

Jul. 2, 2014 International Preliminary Report on Patentability issued in Application No. PCT/JP2013/053471.

*Primary Examiner* — Robert A Siconolfi
*Assistant Examiner* — Mahbubur Rashid
(74) *Attorney, Agent, or Firm* — Oliff PLC

(57) ABSTRACT

Provided is a suspension device in which a load axis of a spring is significantly inclined with respect to a center axis of an absorber. The suspension device includes a support section formed between an end portion of the spring on a spring seat side and a mount, for realizing a "full contact state" during assembly and a "partial contact state" after assembly. With this, it is possible to provide the suspension device in which the assembly is facilitated and the load axis of the spring is significantly inclined with respect to the center axis of the absorber.

5 Claims, 4 Drawing Sheets

(56) References Cited

U.S. PATENT DOCUMENTS

| | | | |
|---|---|---|---|
| 2004/0084821 A1* | 5/2004 | Bottene | B60G 15/063 267/286 |
| 2006/0131119 A1 | 6/2006 | Ishikawa | |
| 2006/0215945 A1 | 9/2006 | Miyata et al. | |
| 2007/0158925 A1* | 7/2007 | Fader | B60G 11/16 280/124.147 |

FOREIGN PATENT DOCUMENTS

| | | | | |
|---|---|---|---|---|
| DE | 102006010054 B4 * | 8/2014 | | B60G 11/16 |
| FR | 2637338 A1 * | 4/1990 | | B60G 11/16 |
| JP | S58-44210 U | 3/1983 | | |
| JP | H03-121915 A | 5/1991 | | |
| JP | 2000-179601 A | 6/2000 | | |
| JP | 2001-225625 A | 8/2001 | | |
| JP | 2001-330071 A | 11/2001 | | |
| JP | 2003-049885 A | 2/2003 | | |
| JP | 2003-326932 A | 11/2003 | | |
| JP | 2004-293589 A | 10/2004 | | |
| JP | 2006-194426 A | 7/2006 | | |
| JP | 2008-089151 A | 4/2008 | | |
| JP | 2010-164071 A | 7/2010 | | |
| JP | 2011-063200 A | 3/2011 | | |

* cited by examiner

VEHICLE SUSPENSION DEVICE

TECHNICAL FIELD

The present invention relates to a vehicle suspension device, and more particularly, to a strut-type suspension device including a spring.

BACKGROUND ART

In general, a strut-type suspension device has such a structure that a spring-integrated shock absorber including, in combination, a spring and an outer cylinder having an absorber built therein and a lower arm are coupled to a knuckle, thereby supporting a wheel.

In JP 2003-326932 A, there is disclosed a technology of arranging a center axis of the spring so as to be inclined with respect to a center axis of an absorber for the purpose of obtaining a load axis of the spring that can withstand a bending stress applied to an absorber rod generated due to vehicle weight or received from a road surface. According to the above-mentioned structure, driving comfort of a vehicle can be enhanced.

SUMMARY OF INVENTION

Incidentally, according to the description of JP 2003-326932 A, the center axis of the spring is inclined with respect to the center axis of the absorber, and hence an upper end turn portion of the spring is inclined during assembly. Therefore, for example, as illustrated in FIG. 6, an upper support 4 is inclined during assembly of the upper support 4, with the result that easiness of assembly is deteriorated.

The present invention has been made in view of the above-mentioned problem, and has an object to enhance easiness of assembly in a vehicle suspension device of such a type that a load axis of a spring may be inclined with respect to a center axis of an absorber.

In order to achieve the object described above, according to one embodiment of the present invention, there is provided a vehicle suspension device, including: an absorber; an outer cylinder having the absorber built therein; a coil spring arranged coaxially with the absorber, the coil spring including end turn portions at both ends thereof and a spring portion between the end turn portions; a spring seat on which the coil spring is mounted, the spring seat being provided on an outer circumference of the outer cylinder; and an upper support for holding the coil spring between the upper support and the spring seat. In this case, a support member is formed in a region between the spring seat and the spring portion. The support member is configured to support the spring portion with respect to the spring seat during assembly. The support member is prevented from supporting the spring portion with respect to the spring seat during a usage state. The description "prevented from supporting" herein encompasses a state in which, when another member is provided in the region between the spring seat and the spring portion so as to be held in contact with each other, the supporting force is reduced as compared to that during assembly.

Further, according to another embodiment of the present invention, there is provided a vehicle suspension device, including: an absorber; an outer cylinder having the absorber built therein; a coil spring arranged coaxially with the absorber, the coil spring including end turn portions at both ends thereof and a spring portion between the end turn portions; a spring seat on which the coil spring is mounted, the spring seat being provided on an outer circumference of the outer cylinder; and an upper support for holding the coil spring between the upper support and the spring seat. In this case, a support member is formed in a region between the spring seat and the spring portion. The support member is formed so as to be held in contact with each of the spring portion and the spring seat during assembly. The support member is configured to secure a clearance between the spring portion and the spring seat during a usage state. In this case, when another member is provided in the region between the spring portion and the spring seat, the clearance only needs to be secured between the spring portion and the spring seat. Typically, during the usage state, the support member is formed so as to be held in contact with only one of the spring portion and the spring seat while avoiding contact with the other of the spring portion and the spring seat. The entire shape of the support member during the usage state is different from that during assembly. In other words, the support member during the usage state is deformed as compared to the shape during assembly.

Typically, in the above-mentioned vehicle suspension device, a number of turns of one of the end turn portions of the coil spring on the spring seat side is less than one. In this case, the support member is formed between the spring seat and a "part of the spring portion corresponding to a region, in which the end turn portions on the spring seat side is absent," when the coil spring is viewed from the spring seat side along a center axis of the coil spring.

According to the above-mentioned structure, the coil spring is arranged coaxially with the absorber. In addition, during assembly, the support member supports, with respect to the spring seat, the spring portion (part of the spring portion corresponding to the region, in which the one of the end turn portions on the spring seat side is absent). In other words, a "full contact state" described later can be obtained. Accordingly, the state in which the center axis of the coil spring and the center axis of the absorber are substantially aligned with each other can be stably ensured. Therefore, during assembly, the upper support becomes substantially parallel to a ground surface, with the result that the assembly work is facilitated. Further, during the usage state, the support member does not support, with respect to the spring seat, the spring portion (part of the spring portion corresponding to the region, in which the one of the end turn portions on the spring seat side is absent). In other words, a "partial contact state" described later can be obtained. Accordingly, the load axis of the coil spring can be inclined with respect to the center axis of the absorber while maintaining the state in which the coil spring is arranged coaxially with the absorber (state in which the center axis of the coil spring is arranged coaxially with the center axis of the absorber). According to the present invention described above, it is possible to enhance the easiness of assembly in the vehicle suspension device of such a type that the load axis of the spring may be inclined with respect to the center axis of the absorber.

In the vehicle suspension device according to the one embodiment of the present invention, the support member includes a mount interposed between one of the end turn portions and the spring seat. According to the above-mentioned structure, during the usage state, a load that the spring seat receives from the end turn portions of the spring is distributed.

In the vehicle suspension device according to the one embodiment of the present invention, it is preferred that the support member have a projection portion formed thereon, and the spring seat have a hole formed therein so as to be opposed to the projection portion.

According to the above-mentioned structure, for example, when a predetermined compression load is applied, the projection portion is fitted into the hole. Therefore, after the compression, that is, after the assembly, the misalignment of the coil spring or the support member with respect to the spring seat can be suppressed.

In the vehicle suspension device according to the one embodiment of the present invention, it is preferred that the support member include a plastically deformable member. According to the above-mentioned structure, during assembly, it is unnecessary to adjust a position of the coil spring or the mount with respect to the spring seat.

DESCRIPTION OF EMBODIMENTS

Now, embodiments of the present invention are described with reference to the drawings.

Figure 5:
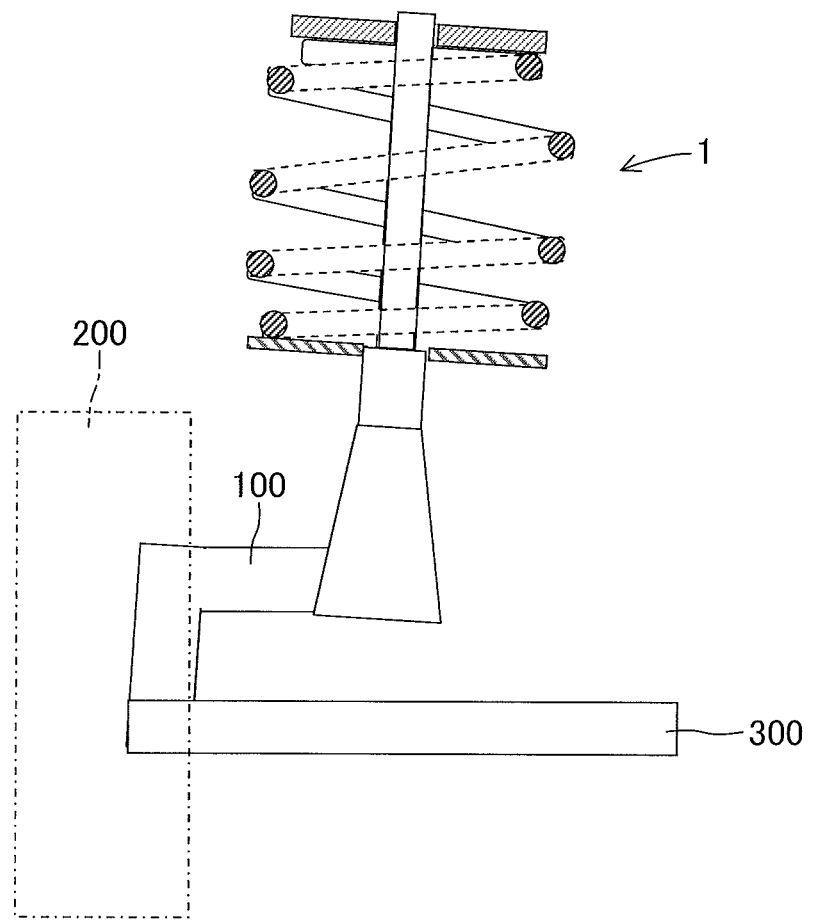
FIG. 5 is a view illustrating a state of assembly of a strut-type suspension device to a vehicle.
Figure 6:
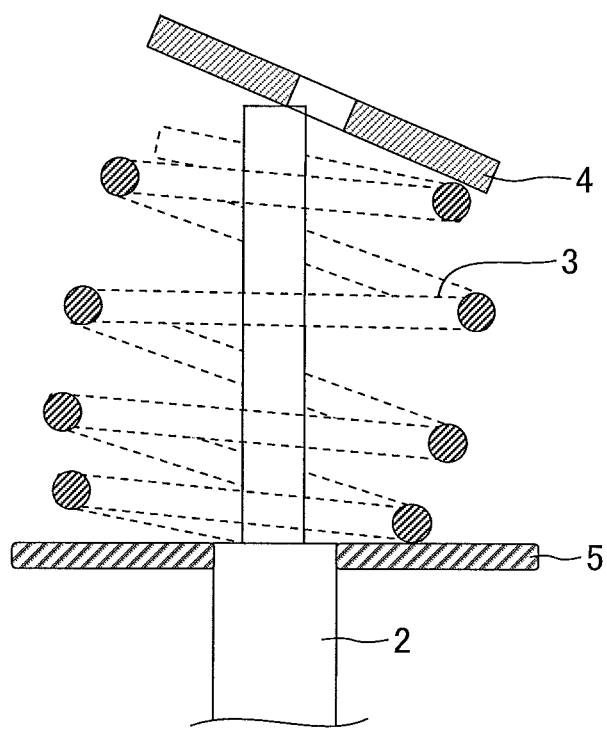
FIG. 6 is a sectional view illustrating an inclination of an upper support during assembly of the suspension device.

As illustrated in FIG. 5, a suspension device 1 is provided inside a wheelhouse, and is connected to a wheel 200 through intermediation of a knuckle 100. A lower arm 300 is connected to the wheel 200. The suspension device 1 is interposed between the wheel 200 and a vehicle body, with the result that vibration caused due to driving can be effectively reduced.

Figure 1:
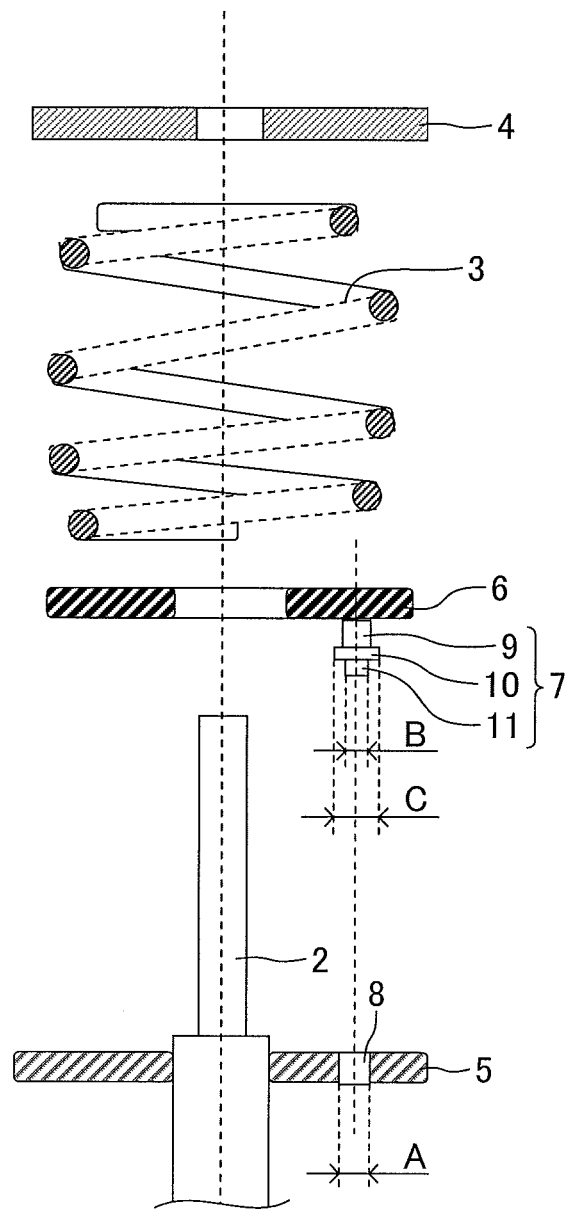
FIG. 1 is a sectional view illustrating a structure of a suspension device before assembly according to an embodiment of the present invention.
Figure 2:
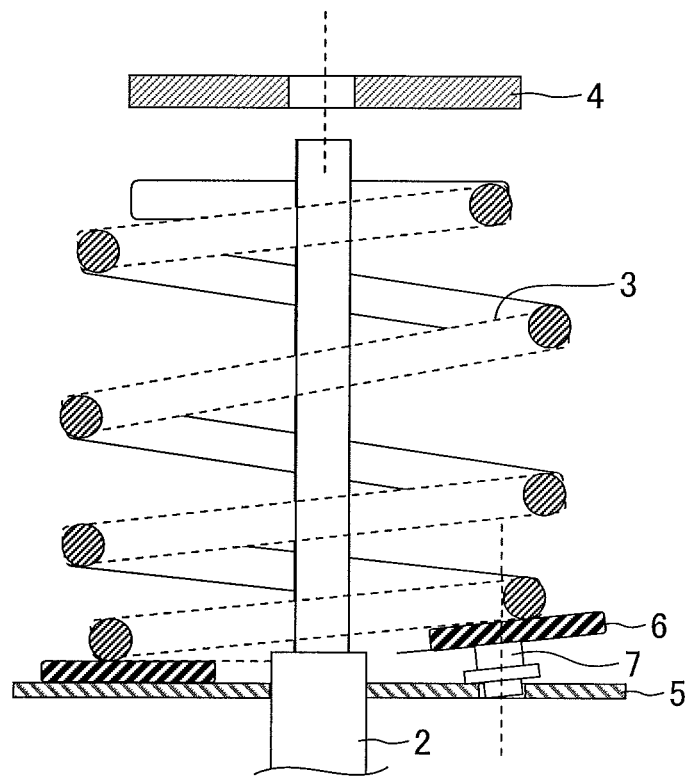
FIG. 2 is a sectional view illustrating a structure of the suspension device during assembly according to the embodiment of the present invention.
Figure 3:
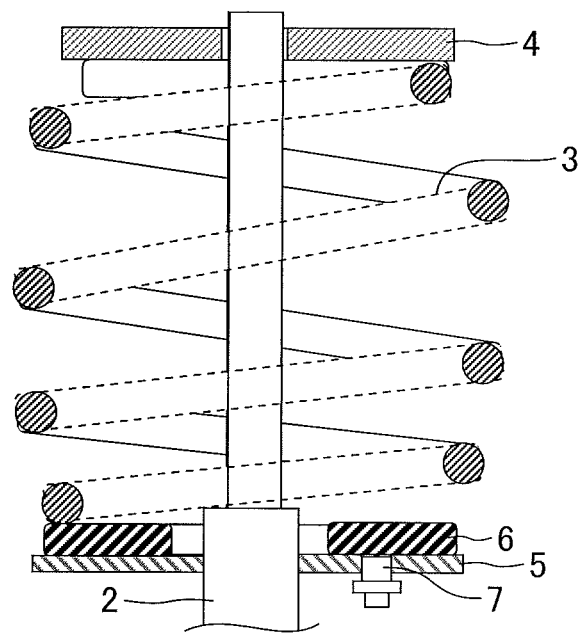
FIG. 3 is a sectional view illustrating a structure of the suspension device after assembly (during a usage state) according to the embodiment of the present invention.

FIG. 1 illustrates a state before assembly according to the present invention. FIG. 2 illustrates a state during assembly according to the present invention. FIG. 3 illustrates a "usage state" according to the present invention, and this state is realized through the "assembly" as illustrated in FIG. 2.

As illustrated in FIG. 1, the suspension device 1 of this embodiment includes an absorber 2, a spring 3, an upper support 4, a spring seat 5, a mount 6, and a support section 7.

The absorber 2 is, for example, a hydraulic shock absorber. The spring 3 is, for example, a coil spring made of metal. The spring 3 that functions as a spring includes a spring portion that functions as a spring and end turn portions. The end turn portion refers to flat portions at both ends of the spring, which do not function as a spring. In this case, it suffices that the number of turns of the end turn portion of the spring 3 on the spring seat 5 side be less than one, and in this embodiment, the number of turns thereof is one half or less.

The upper support 4 and the spring seat 5 are, for example, made of metal, and are substantially flat plates having a doughnut shape. As illustrated in FIG. 3, during the usage state, the upper support 4 is held in contact with the end turn portion of the spring 3. The spring seat 5 is welded and joined to an outer cylinder of the absorber 2, and is held in contact with the end turn portion of the spring 3 through intermediation of the mount 6 described below. That is, the spring 3 is held between the upper support 4 and the spring seat 5.

As illustrated in FIG. 1, the spring seat 5 has a hole 8 having a diameter A.

The mount 6 is, for example, made of resin, and is a substantially flat plate having a doughnut shape. The mount 6 is interposed between the spring 3 and the spring seat 5, and is held in contact with the end turn portion of the spring 3. The mount 6 mitigates an impact applied to the spring seat 5 when the spring 3 contracts.

As illustrated in FIG. 2, the support section 7 is integrally formed on the mount 6 at a position opposed to the hole 8. The support section 7 is made of rubber, resin, or the like. Note that, the mount 6 and the support section 7 correspond to a support member in the present invention. The support section 7 includes a head portion 11 having a diameter B, a plate member 10 having a diameter C, and a shaft portion 9. In this case, the diameter B of the head portion 11 is smaller than the diameter A of the hole 8 of the spring seat, and the diameter C of the plate member 10 is larger than the diameter A of the hole 8. Therefore, the head portion 11 is inserted into the hole 8 during assembly, and thus the plate member 10 engages with an edge portion of the hole 8.

In the assembly state as illustrated in FIG. 2, a predetermined compression load is applied to the upper support 4, and thus the plate member 10 is deformed and passes through the hole 8. With this, as illustrated in FIG. 3, the shaft portion 9 is inserted into the hole 8, and thus the support section 7 and the hole 8 are fitted to each other.

In this embodiment, as described above, the number of turns of the end turn portion on the spring seat 5 side is less than one. In other words, an end portion of the spring 3 on the spring seat 5 side has two regions when the coil spring 3 is viewed from the spring seat 5 side along the center axis thereof. Specifically, there are formed a region in which the end turn portion is present (range in a circumferential direction), and a region in which the end turn portion is absent (range in the circumferential direction). Accordingly, as illustrated in FIG. 3, during the usage state, a contact surface of the spring 3 with the spring seat 5 (more specifically, the mount 6) is only part corresponding to the end turn portion. That is, the end portion of the spring 3 on the spring seat 5 side is held in contact with the mount 6 only in the region in which the end turn portion is present and is not held in contact with the mount 6 in the region in which the end turn portion is absent, when the coil spring 3 is viewed from the spring seat 5 side along the center axis thereof. This state is hereinafter referred to as a "partial contact state".

Further, during assembly, as illustrated in FIG. 2, a part of the mount 6 is lifted by the support section 7 from the spring seat 5. As a result, the mount 6 is also held in contact with a part of the spring 3 other than the end turn portion, that is, a "part of the spring portion corresponding to the region, in which the end turn portion on the spring seat side is absent, when the coil spring 3 is viewed from the spring seat 5 side along the center axis thereof". More specifically, the end portion of the spring 3 on the spring seat 5 side is held in contact with the mount 6 not only in the region in which the end turn portion is present but also in the region in which the end turn portion is absent, when the coil spring 3 is viewed from the spring seat 5 side along the center axis thereof. This state is hereinafter referred to as a "full contact state". Note that, the "full contact state" encompasses a state in which the end turn portion and the mount 6 are held in surface contact with each other in a case where the number of turns of the end turn portion on the spring seat 5 side is one or more (that is, in a case where the end turn portion is present at the end portion of the spring 3 on the spring seat 5 side over the entire region in the circumferential direction, when the coil spring 3 is viewed from the spring seat 5 side along the center axis thereof).

According to the above-mentioned structure, when the spring 3 and the mount 6 are in the "partial contact state", a load axis of the spring 3 is significantly inclined with respect to the center axis of the absorber 2 as compared to the "full contact state". With this, it is possible to obtain such a load axis of the spring that can withstand a bending stress applied to an absorber rod, which is generated due to vehicle weight or received from a road surface, with the result that the spring 3 can suppress the bending stress that the suspension receives due to the vehicle weight or from the road surface. Further, the suspension device 1 is downsized as compared to that when the center axis of the spring 3 is offset in order to incline the load axis, with the result that a space in the wheelhouse can be reduced.

In this embodiment, as described above, the support section 7 and the hole 8 opposed to the support section 7 are formed. According to the above-mentioned structure, as illustrated in FIG. 2, when the spring 3 is mounted on the spring seat 5 during assembly, the plate member 10 is caught on the hole 8, with the result that the "full contact state" is realized between the mount 6 and the spring 3. Accordingly, the state in which the center axis of the coil spring 3 and the center axis of the absorber 2 are substantially aligned with each other can be stably ensured. Therefore, during assembly, the upper support 4 becomes substantially parallel to a ground surface, with the result that the assembly work is facilitated. In this case, the head portion 11 of the support section 7 serves for positioning of the support section 7 with respect to the hole 8. Further, during the usage state, as illustrated in FIG. 3, the shaft portion 9 of the support section 7 is fitted into the hole 8. Therefore, the misalignment of the mount 6 with respect to the spring seat 5 can be suppressed.

The present invention is not limited to the above-mentioned embodiment, and for example, the support section 7 may be formed in a region between the mount 6 and the spring 3. Further, the mount may be omitted in a region between the spring seat 5 and the spring 3. In this case, during assembly, the support section 7 supports the spring portion of the spring 3. According to the above-mentioned structure, the number of components can be reduced, with the result that the cost can be reduced.

Figure 4:
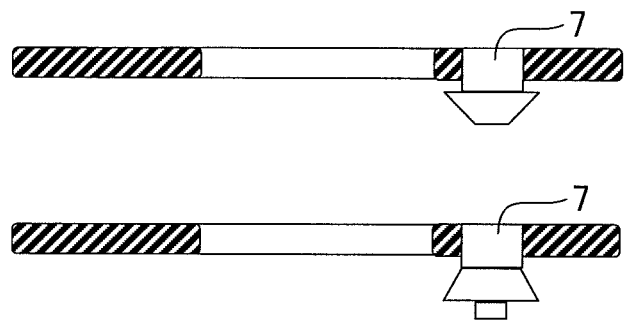
FIG. 4 is a sectional view illustrating a structure of a suspension device according to another embodiment of the present invention.

The present invention is not limited to the above-mentioned embodiment, and for example, as illustrated in FIG. 4, the plate member 10 of the support section 7 may have a tapered shape. In short, the support section 7 may have such a structure that, during assembly, the plate member 10 is not deformed by the weight of the spring 3 itself without passing through the hole 8 (the shaft portion 9 is not fitted into the hole 8), but the plate member 10 is deformed by a compression load during assembly of the upper support to pass through the hole 8 (the shaft portion 9 is fitted into the hole 8). Note that, a plurality of support sections 7 and a plurality of holes 8 may be formed.

Further, for example, as illustrated in FIG. 4, the support section 7 may be integrally formed on the mount 6.

Further, the support section 7 may be formed of a plastically deformable member. In this case, during assembly, the support section 7 is held in contact with (supports) the mount 6 (the spring 3 when the mount 6 is not provided), and during the usage state, the support section 7 is not held in contact with (does not support) the mount 6 (the spring 3 when the mount 6 is not provided). That is, the support section 7 is plastically deformed by a predetermined compression load applied thereto so that the support section 7 is smaller in height during the usage state than during assembly. For example, during the usage state, the support section 7 may be crushed. According to the above-mentioned structure, it is unnecessary to form the hole 8 in the spring seat 5 or the mount 6, with the result that the work of positioning the hole 8 and the support section 7 so as to be opposed to each other becomes unnecessary.

The invention claimed is:

1. A vehicle suspension device, comprising:
an absorber;
an outer cylinder having the absorber built therein;
a coil spring having a load axis which is inclined with respect to a center axis of the absorber and a center axis that is arranges coaxially with the center axis of the absorber, the coil spring comprising a spring portion that functions as a spring and end turn portions formed at both ends of the springs, the end turn portions being flat portions that do not function as a spring;
a spring seat on which the coil spring is mounted, the spring seat being provided on an outer circumference of the outer cylinder; and
an upper support for holding the coil spring between the upper support and the spring seat; wherein:
the spring seat is provided with a support member,
the support member being configured to support the spring portion while being in abutting contact with the spring seat and the spring portion during assembly,
the support member is not in abutting contact with the spring portion and does not support the spring portion with respect to the spring seat during a usage state after the assembly.

2. A vehicle suspension device according to claim 1, wherein:
the support member comprises:
a mount interposed between the end turn portions and the spring seat; and
a projection portion formed on the support member, and
the spring seat has a hole formed therein so as to be opposed to the projection portion.

3. A vehicle suspension device according to claim 1,
wherein the support member has a projection portion formed thereon, and
wherein the spring seat has a hole formed therein so as to be opposed to the projection portion.

4. A vehicle suspension device according to claim 1, wherein the support member comprises a plastically deformable member.

5. A vehicle suspension device according to claim 1,
wherein a number of turns of one of the end turn portions of the coil spring on the spring seat side is less than one, and
wherein the support member is formed between the spring seat and a part of the spring portion corresponding to a region, in which the one of the end turn portions on the spring seat side is absent, when the coil spring is viewed from the spring seat side along a center axis of the coil spring.

* * * * *